A. Stephenson,
Hydrant.
Nº 49,801. Patented Sep. 5, 1865.
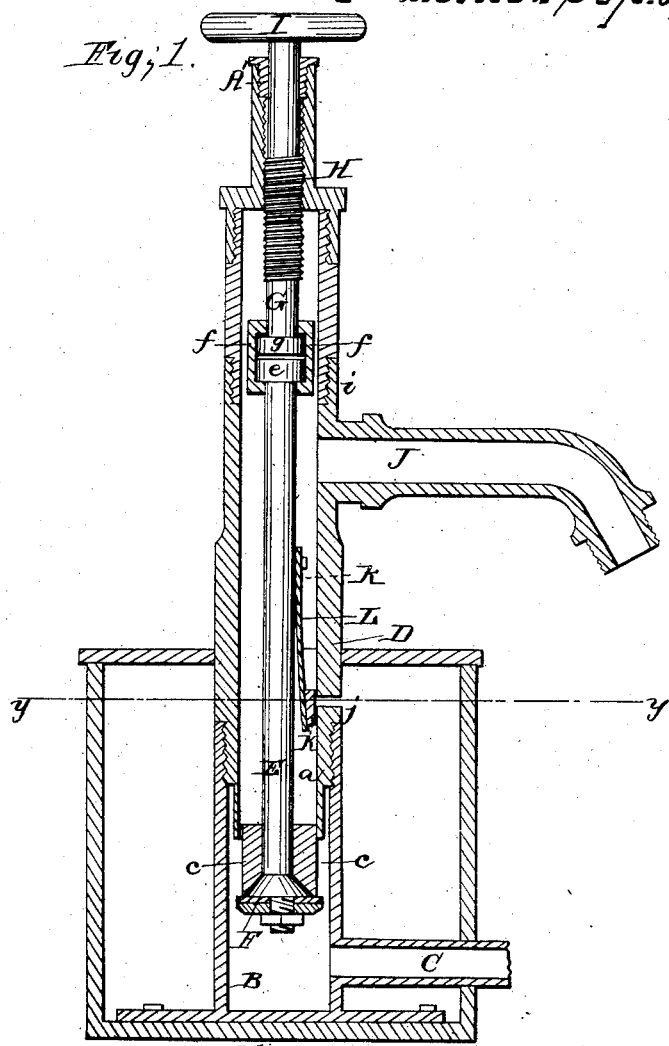
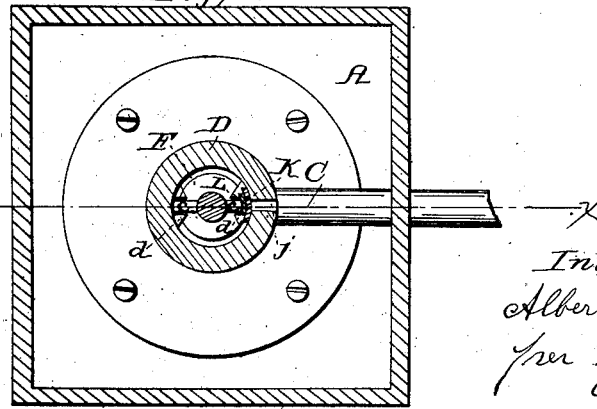
Witnesses:
Wm Drewn
Theo Tusch
Inventor:
Albert Stephenson
per Munn & Co
Attorneys

UNITED STATES PATENT OFFICE.

ALBERT STEPHENSON, OF ST. LOUIS, MISSOURI.

IMPROVEMENT IN HYDRANTS.

Specification forming part of Letters Patent No. 49,801, dated September 5, 1865.

*To all whom it may concern:*

Be it known that I, ALBERT STEPHENSON, of St. Louis, in the county of St. Louis and State of Missouri, have invented a new and useful Improvement in Hydrants; and I do hereby declare that the following is a full, clear, and exact description thereof, which will enable others skilled in the art to make and use the same, reference being had to the accompanying drawings, forming part of this specification, in which—

Figure 1 is a vertical section of my invention, taken in the line $x\ x$, Fig. 2; Fig. 2, a horizontal section of the same, taken in the line $y\ y$, Fig. 1.

Similar letters of reference indicate like parts.

This invention relates to a new and improved hydrant for drawing and stopping at will water or other fluids from reservoirs or from pipes fed or supplied from reservoirs.

The object of the invention is to obtain a hydrant which may be readily removed or detached when necessary, and also applied to the main, and one which will admit of the escape of the water, so as to avoid the contingency of the hydrant freezing up in winter.

A represents a box, which may be of wood or other material, fitted permanently in the earth and having secured within it a metallic chamber, B, which communicates with the main or water supply pipe by means of a pipe, C. This chamber B is a fixture within A, and the former has a female screw-thread, $a$, cut in its upper part, into which the lower end of a pipe, D, is screwed, the latter forming the main part or body of the hydrant.

Other means may be devised for connecting D with B, but the screw-coupling will probably answer as good a purpose as any other. The lower end of the pipe D is a valve-seat, $b$, which extends down into B below the screw-coupling. The pipe D may be of any desired length or diameter.

E represents a rod, which is fitted within D, and has a valve, F, at its lower end, guides $c\ c$ being at the lower end of the rod above the valve and fitting in grooves $d$ in the lower part of D. The upper end of the rod E is provided with a cylindrical head, $e$, which is fitted within a cylindrical box composed of two longitudinal parts, $f\ f$, which are kept in contact, so as to inclose said head by the pipe D; and within said box there is also a cylindrical head, $g$, on the lower end of a rod, G, which passes through the top of pipe D, and has a screw-thread, $h$, upon it which works in a female screw in a cap or nut, H. (See Fig. 1.) This nut or cap may be provided with a stuffing-box A'. By this arrangement it will be seen that by turning rod G, which may be done through the medium of a wheel, I, or its equivalent, the valve-rod E will be raised and lowered by the screw and nut previously alluded to, and the valve F opened and closed, as desired.

The pipe D is composed of two parts connected by a screw-coupling, $i$, so that the coupling of the rods E G may be rendered accessible when necessary or desired. The pipe D is provided with a discharge-spout, J, at any point above the surface of the ground; and in the pipe D, just above the chamber B, there is made an opening, $j$, which, when the valve F is open, is covered by a valve, K. (See more particularly Fig. 1.) This valve K is attached to a spring, L, the upper end of which is connected to the rod E, said spring having a tendency to press the valve K toward the inner side of the pipe D, and causing it to sit or fit water-tight over the hole or opening $j$ when brought in line therewith.

From the above description it will be seen that when the rod E is lowered and the valve F opened the water will flow up through D and out through the spout J, the waste-opening $j$ being closed, and when the rod E is raised and the valve F closed the valve K will not be in line with opening $j$, and the waste water in D will escape through said opening into box A.

I would remark that the spring L may be attached to the rod E by means of a screw, R, passing through an oblong slot in L into the rod, by which means the valve K may be adjusted higher or lower, in order to have it in a proper relative position with the opening $j$ to work properly.

The hydrant thus constructed may be readily taken up or detached from the main and also readily applied. All the parts are rendered accessible for repairs when necessary, and it may be moved or taken from place to place and adjusted for use without the trouble and expense of excavating. The boxes A and chambers B within them being fixtures, do not require to be moved if the device be generally adopted.

I claim as new and desire to secure by Letters Patent—

1. A portable or removable hydrant composed of the chamber B and pipe D, connected by a screw or other coupling, and provided with a valve, F, at the lower end of D, a discharge-spout, J, and a waste-valve, K, arranged to operate in connection with the opening $j$ in D, substantially as set forth.

2. The box A, when used in combination with the hydrant constructed and arranged as described.

ALBT. STEPHENSON.

Witnesses:
JOHN JECKO.
FREDERICK WEINHEIMER.